A. PENTECOST.
CALCULATING MACHINE.
APPLICATION FILED FEB. 28, 1916.
1,296,693.
Patented Mar. 11, 1919.
2 SHEETS—SHEET 2.
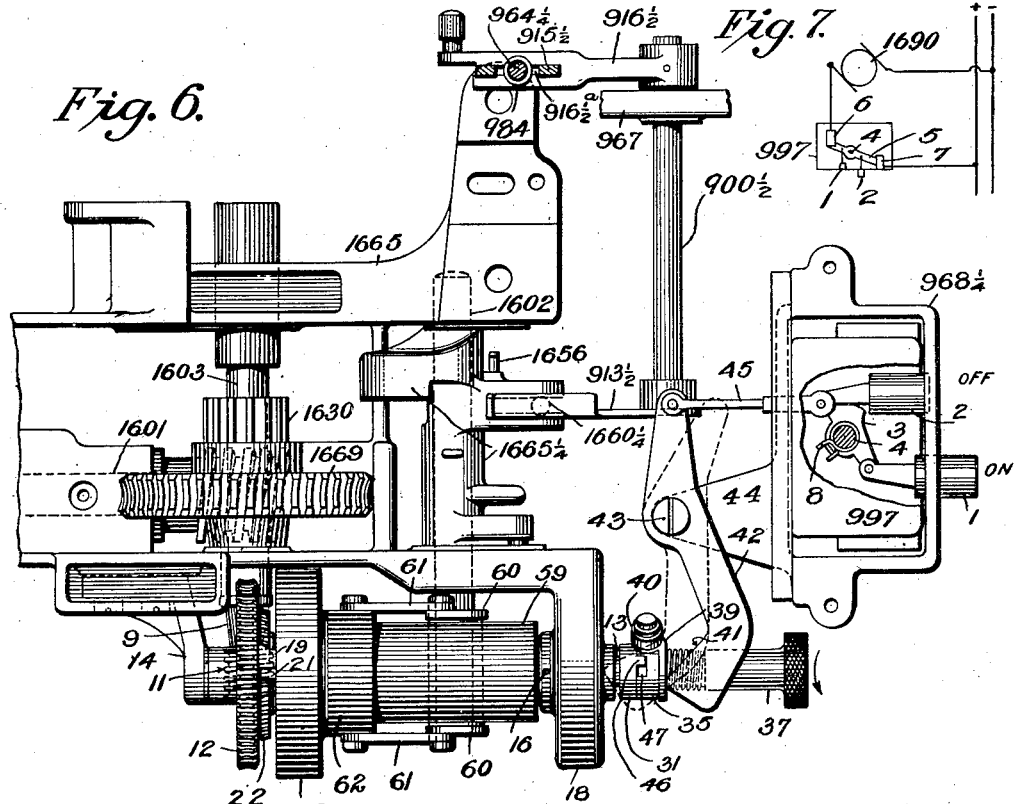
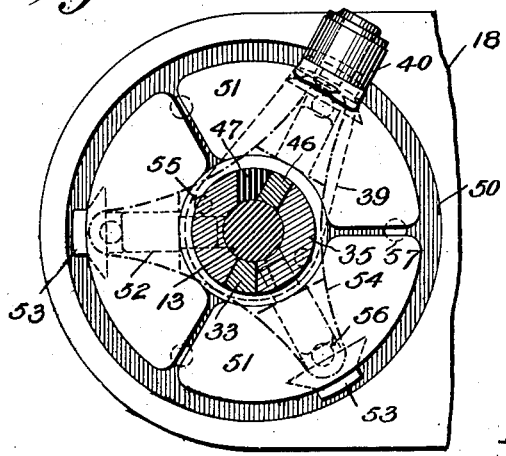
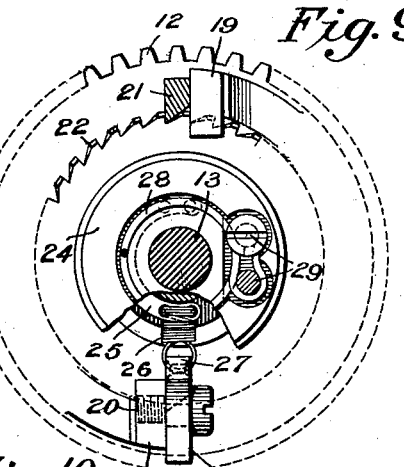
WITNESSES:
Jos. F. Collins
Ralph S. Warfield
INVENTOR
Arthur Pentecost
BY
Jeffries Betts
ATTORNEYS

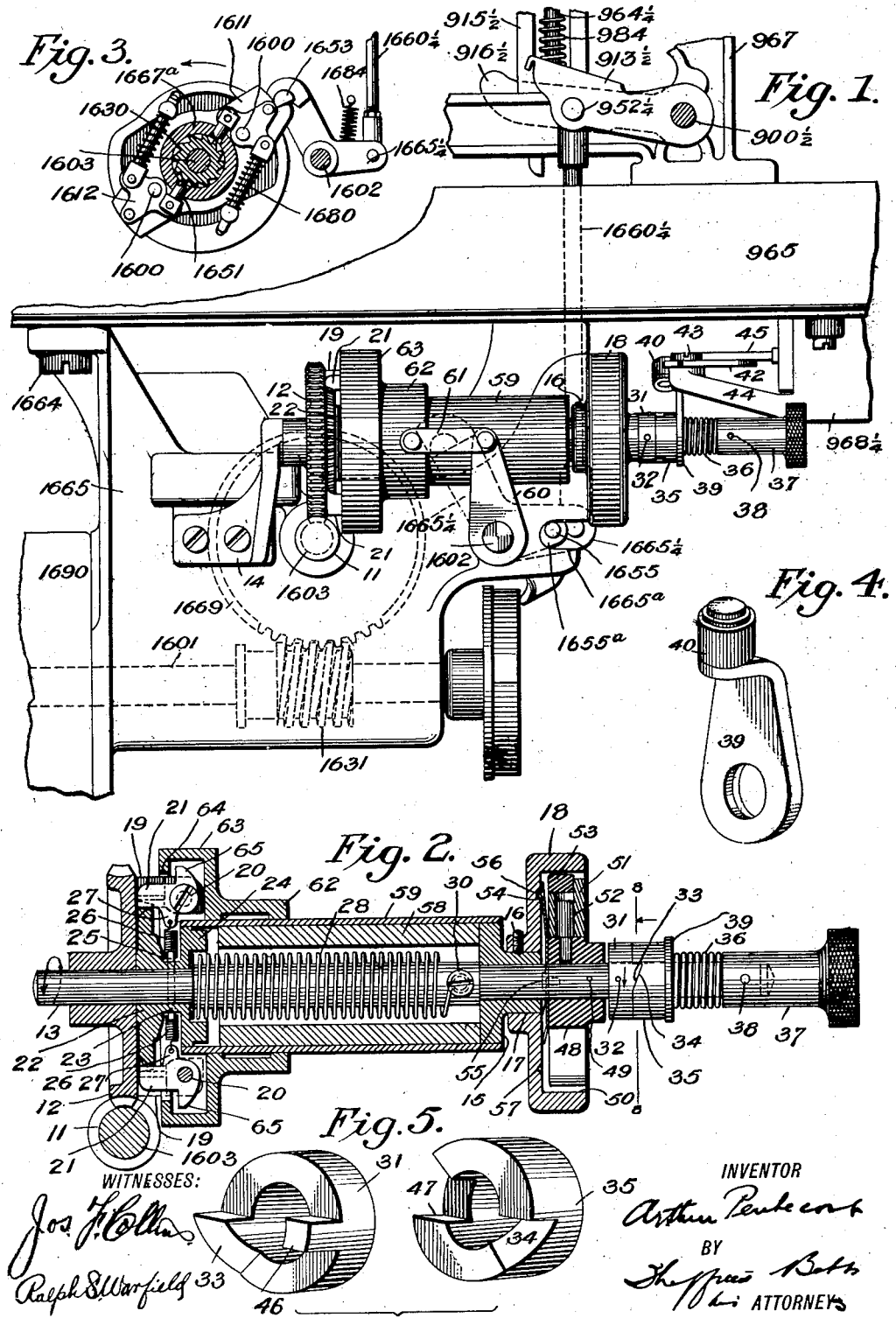

UNITED STATES PATENT OFFICE.

ARTHUR PENTECOST, OF EAST ORANGE, NEW JERSEY, ASSIGNOR TO THE ADDER MACHINE COMPANY, OF WILKES-BARRE, PENNSYLVANIA, A CORPORATION OF PENNSYLVANIA.

CALCULATING-MACHINE.

1,296,693.

Specification of Letters Patent.

Patented Mar. 11, 1919.

Application filed February 28, 1916. Serial No. 80,905.

*To all whom it may concern:*

Be it known that I, ARTHUR PENTECOST, a subject of the King of England, residing at East Orange, Essex county, New Jersey, have invented new and useful improvements in Calculating-Machines, of which the following is a specification.

This invention relates more particularly to automatic motor cut-outs for calculating machines equipped with motors adapted to run continuously.

It frequently happens that a machine operator will forget to turn off the current to the motor when through his work on the machine, and the motor continues to run until the current is interrupted, thereby increasing electric power expense bills and causing deterioration of the motor.

To prevent these conditions, motor-driven devices have been provided to automatically open or break the circuit after the calculating machine has been idle a limited time. An operation of the calculating machine within the period of time, at the expiration of which the cut-off mechanism is set to operate, will effect a resetting of the cutoff mechanism, and thus prevent interruption of the current.

In many of such prior automatic motor cut-outs for calculating machines, turning or depressing a button will complete or make the circuit and energize the motor, but no means is provided to enable the operator to manually break the circuit, or turn off the current in case the machine was locked up or became out of order during its operation, or when the operator had finished his work.

Instead, once the power was switched on, the motor had to run until the time arrived at which the automatic cut-off was set to operate. This was liable to result in greatly straining and injuring both the machine and the motor, if the mechanism was out of order when the power was turned on or became out of order while the motor was running.

One object of the present invention is to enable the operator to manually switch the power off or on at will, as well as to provide automatic means to switch the power off in case the machine is not operated during a certain interval of time.

Another object is the provision of an automatic motor cut-out mechanism readily applicable to or removable from machines in use with but little change.

Still another object is the provision of a neat, compact and simplified automatic motor cut-out mechanism, comprising few parts readily assembled and not liable to get out of order, and operating substantially noiselessly, and without material strain on or undue loading of the motor.

The invention further includes certain other novel features and combinations of parts, all of which will be fully explained hereinafter, and particularly pointed out in the claims.

In the accompanying drawings, Figure 1 is a side elevation of one embodiment of the invention applied to the well-known Wales calculating machine;

Fig. 2 is a sectional view, partly in full lines, showing the automatic cut-out mechanism alone;

Fig. 3 is a detail sectional view, showing the usual Wales clutch mechanism which drives the main shaft of the machine;

Fig. 4 is a detail perspective of the power controller-actuating arm;

Fig. 5 is a perspective of the delayed clutch mechanism, disassembled, which directly operates the controller-actuating arm;

Fig. 6 is a plan view of the invention, applied to the motor drive of a Wales machine;

Fig. 7 is a diagrammatic view, illustrating the motor circuit;

Fig. 8 is a sectional view on line 8—8 of Fig. 2, showing the actuating arm, the delayed clutch, and the governor;

Fig. 9 is a similar view, partly broken away, showing the motor-driven and progressively-acting clutch mechanisms, and Fig. 10 is a detail cross-sectional view, showing one means for driving the automatic motor cut-out mechanism from the motor.

The invention is illustrated in connection with a Wales calculating machine of familiar type, such as is shown in the patents to Wales, #797,032, August 15, 1905; McFarland, #842,232, January 29, 1907; and McFarland and Wales, #880,157, February 25, 1908; equipped with a motor drive and clutch mechanism such as is found in patents to Wilgus, #1,150,916, August 24, 1915, and Kuentzler, #1,151,803, August 31, 1915, the supply of power to the motor being controlled by a switch and circuit similar to that illustrated in patent to Hunter and Küntzler, #1,093,424, April 14, 1914, omitting the lamp and its conductor therein shown.

The calculating machine includes side frames 967 (Figs. 1 and 6) mounted on a base 965 to support the operative parts of the machine, a further understanding of which may be found in the foregoing patents, to which reference is made.

Suspended beneath the base is a motor 1690 which drives a worm shaft 1601 having its bearings in a hanger 1665 secured to the base by screws 1664. A worm 1631 fast on the worm shaft, drives a worm wheel 1669 journaled on a counter shaft 1603 having its bearings in the hanger 1665 above the worm shaft and at right angles thereto. A normally idle clutch mechanism (Fig. 3) controlled by a starting key 915 1/2 (Fig. 1), releasably connects the worm wheel 1669 to the counter shaft 1603.

This clutch comprises a ratchet 1630 (Fig. 3) loose on the counter shaft 1603 and turning with the motor-driven worm wheel 1669. A hub 1667ª fast on the counter shaft encircles the ratchet. Pawls 1651 pivotally secured to one arm of their respective rockers 1612, project through apertures in the hub to engage the ratchet and effect the rotation of the counter shaft.

The rockers 1612 are pivoted at 1600 to oppositely extending arms of a carrier 1611 journaled on the hub 1667ª. Springs 1680 connected to the remaining arms of the rockers 1612 partially rotate the carrier and press the pawls 1651 into engagement with the ratchet 1630.

A laterally projecting stud 1653 on a clutch-releasing finger 1665 1/4 fastened to a shaft 1602 parallel with the counter shaft 1603, normally engages one arm of the carrier 1611 to cause the carrier to rock against the tension of springs 1680 and withdraw the pawls 1651 from the ratchet 1630.

A restoring spring 1684 holds the clutch-releasing finger 1665 1/4 in effective position to maintain the pawls withdrawn.

Depression of the starting key 915 1/2 slidable through a slot 916 1/2ª (Fig. 6) in a lever arm 916 1/2, on a shaft 900 1/2, compresses a spring 984 (Figs. 1 and 6) resting upon the lever arm 916 1/2 to rock the latter, and turn the shaft 900 1/2. The shaft 900 1/2 is journaled in the side frames 967 (Fig. 1) and carries a second arm 913 1/2, which, when rocked, depresses a link 1660 1/4, connecting the arm 913 1/2, to the tail of the clutch-releasing finger 1665 1/4 (Fig. 3).

The link 1660 1/4 rocks the finger 1665 1/4 against the tension of restoring spring 1684 to release the pawl carrier 1611, freeing the latter and the rockers 1612, to the action of the springs 1680, which thereupon oscillate the rockers to engage the dogs or pawls 1651 with the ratchet 1630 and thus connect the motor and counter shaft, through the worm gearing and clutch mechanism. The counter shaft 1603 drives the main shaft (not shown) of the calculating machine.

For a more complete explanation of the motor drive, including the clutch mechanism and the connections from the motor to the main drive shaft, as well as the starting key mechanism, reference is made to United States Patents to Wilgus, #1,150,916, and to Kuentzler, #1,151,803, above mentioned.

An electric motor is preferably employed, and power therefor is derived from any suitable source of supply, as the ordinary lighting circuit, for instance, the power being admitted to or cut off from the motor 1690 by any usual form of electric switch, in the motor circuit, as the push button switch 997 (Figs. 6 and 7).

These switches commonly include push buttons 1 and 2 (Fig. 6) pivotally connected to the opposite arms of a rocker 3 fixed on a shaft 4, which shaft also carries the blade 5 (Fig. 7) adapted to open or close the circuit between the contacts 6 and 7 within the switch box.

Depressing either button 1 or 2, turns the rocker against the tension of a relatively strong spring 8, to operate the blade to close or open the circuit between the contacts.

Releasable locking means, not shown, is provided to retain the blade where adjusted until the button has been depressed nearly to its limit of movement, whereby to greatly tension the spring 8 so that upon the release of the locking means, the blade will be snapped to its opposite limit of travel and again locked.

A casing 968 1/4 secured to the base 965 of the machine, incloses the switch mechanism 997 and protects it against injury.

The switch buttons, in my present invention, are unobstructed and readily accessible to the operator, to enable him to manually switch the power on or off at will.

The foregoing is not herein claimed as new *per se* and only constitutes part of the present invention in so far as it is combined with the novel features now to be disclosed.

The switch or power controller 997, besides being easily actuated by the operator, is automatically actuated from the motor through a progressively acting mechanism, the effectiveness of which is complete only after the lapse of a predetermined interval of time, to open the motor circuit and prevent waste of current and wear of the parts while the machine is not being operated.

The form of automatic cut-off selected for illustration, comprises a clutch mechanism, or a series of successively acting clutches, the initial one of which is driven from the motor, and the final one of which operates controller-actuating means to switch off the current, but it is possible to use a less number of clutch mechanisms, if desired, without departing from the scope of this invention.

Referring to Fig. 10, the hub 1669ª of the motor-driven worm wheel 1669 is counterbored to fit over the inner end of a stub shaft 9 journaled in the hanger 1665, the hub being secured in any suitable manner to the stub shaft, as by a set screw 10, to drive the shaft. The inner end of the stub shaft may be conveniently bored to form a seat for the adjacent end of the counter shaft 1603.

A worm 11 on the stub shaft, drives a worm gear 12, journaled on a supporting shaft 13 (Figs. 2 and 9) mounted at one end in a bearing formed in a bracket 14, (Figs. 1 and 6), projecting from the hanger 1665, the opposite end of the shaft passing through a bearing gland 15 (Fig. 2) fastened, as by a set screw 16 in a hollow boss 17, formed in a flange or wing 18 (Fig. 6) extending laterally from the hanger 1665.

The worm gear 12 constitutes the drive member of a positive or initial clutch and carries projecting fixtures 19, which, at points 20 near their outer ends, pivotally support pawls or dogs 21. The effective arms of the pawls 21 extend backwardly from their pivot points toward the face of the worm gear, and lie substantially parallel with the fixtures. The lower edges of the free ends of the arms overhang and coact with the teeth of a ratchet or driven member 22, concentric with the worm gear 12 but of less diameter. The fixtures, with which the pawls contact, brace the pawls against lateral strain, (see Fig. 9), and lie beyond the toothed periphery of the driven member 22 of the positive clutch, which is releasably engaged by the pawls.

The driven member (Fig. 2) conveniently forms part of a spool-shaped sleeve 23 loose on the shaft 13 and having the toothed wheel 22 at one end, and a circular flange 24 at its opposite end.

A yoke 25 (Figs. 2 and 9) loosely embraces the waist of the sleeve, and springs 26 connect the respective arms of the yoke with ears 27 on the pawls or dogs 21, to retain the latter in engagement with the ratchet or driven member 22. Relative rotation between the drive and driven members of the positive clutch, when disengaged, may take place without displacement or distortion of the springs, owing to the loose engagement of the yoke and sleeve.

The driven member 22 of the positive clutch mechanism drives a progressively acting clutch comprising a spring 28 (Fig. 2) coiled loosely around the supporting shaft 13, one end of which spring is secured at 29 (Fig. 9) to the flange 24 of the sleeve, the other end of the spring being fastened at 30 (Fig. 2) to the shaft.

One end of the spring being attached to a winding device, and the other end being fastened and temporarily prevented from turning, it is obvious that as the winding device (the driven member 22) turns, the spring coils will gradually contract about, and, after a predetermined lapse of time, grip the shaft 13 to rotate the latter, the spring constituting a flexible constricting clutch, the inherent resiliency of which tends to turn the shaft before the coils grip it.

The speed of rotation of the motor worm shaft 1601, (Fig. 1) is successively geared down through the engagement of worm 1631 and worm wheel 1669, and also through the engagement of worm 11 and worm gear 12, so that a plurality of rotations of the sleeve 23 are required before the spring clutch 28 exerts a power on the shaft 13 sufficient to turn the latter, and it is this delayed action of which I take advantage to afford the operator a predetermined amount of time within which to operate the machine before the power is cut off from the motor. Such cut-off is directly and positively accomplished in the present instance, as follows:

A dilatory clutch mechanism is mounted on that end of the supporting shaft 13 which projects beyond the flange 18 of the hanger, and comprises a drive member, in the form of a collar 31 pinned to the shaft 13, as at 32, and having an inclined or cam tooth 33 projecting from the outer edge thereof and normally fitting in a similarly shaped recess 34 formed in the adjacent edge of a hub 35 loose on the shaft. A compression spring 36 surrounding the shaft 13 presses the hub 35 against the collar to maintain them in complete engagement. One end of the spring 36 bears against the hub and the opposite end contacts an abutment 37 secured to the shaft 13, at 38.

An arm or controller-actuating member 39 (Figs. 1, 4 and 6) forms part of and projects radially from the hub 35, and preferably carries an anti-friction roll 40 at its outer end to wipe along a cam 41 on one arm of a lever 42 (Fig. 6) pivoted at 43 to a bracket 44 projecting from the switch casing 968 1/4. A link 45 connects the opposite arm of the lever 42 with that arm of the switch rocker 3 to which the circuit breaking or "off" button 2 is connected, so that when the lever is rocked by the member 39, it will, as it reaches its limit of travel, operate the switch to open the circuit.

In the manual operation of the switch, depression of the "on" or circuit making button 1 (Fig. 6) shifts the rocker 3 against the tension of spring 8, and swings the switch blade 5 (Fig. 7) to engage the contacts 6 and 7. The rocker in its travel, forces the "off" or circuit breaking button 2 outwardly from the switch box and also swings the lever 42 from its idle position, shown in full lines in Fig. 6, to its effective position, shown in dotted lines in the same figure, in which position, the cam end of the lever lies in the path of the controller-actuating arm 39. Obviously other means than the particular lever 42 shown might be interposed between the switch and the arm 39, or if it was desired to obstruct the face of the switch box, the arm 39 could be arranged to operate directly against the protruded "off" button.

Assuming the "on" button 1 to have been depressed to complete the motor circuit, the power energizes the motor to drive the worm shaft 1601 (Fig. 1), and through the worm 1631, worm wheel 1669, stub staft 9, and worm 11, turns the worm gear 12 of the positive clutch. The pawls 21 normally engaging the ratchet or driven member 22 of the positive clutch, transmit motion thereto to rotate the latter on the shaft 13 and wind the spring or progressively acting clutch 28, the coils of which gradually contract until they develop sufficient power to turn the shaft 13 against such slight frictional resistance to its rotation as is present at this time.

As the shaft turns, it rotates the collar or drive member 31 of the dilatory clutch mechanism, the inclined or cam tooth 33 of which travels in the direction of the arrow, (Fig. 2). The pressure of the resetting spring 36 holds the loose hub or driven member 35 of the delayed clutch mechanism snugly against the collar, which tends to rotate the hub, and with it the controller-actuating arm 39 until the outer end of the latter contacts the cam 41 of the lever 42 (as shown in dotted lines in Fig. 6).

The relatively strong spring 8 holds the lever 42 in its dotted line position, Fig. 6, and the resistance thus encountered, arrests the arm 39, and with it the hub 35, collar 31 and shaft 13. The positive clutch mechanism, however, continues to wind the coils of the flexible clutch 28 more tightly about the shaft 13 until the latter again starts to rotate.

At this time, the grip of the flexible clutch is sufficiently strong to turn the shaft and the collar 31 in spite of the resistance offered by the lever 42, arm 39 and hub 35, which is not at present overcome, and consequently, the controller-actuating arm 39 and its hub 35 remain stationary, or at most, turn but slightly. Now, the rotation of the shaft 13, and the collar 31, causes the tooth 33 of the collar to wipe along the inclined face of the recess 34, and forces the hub axially of the shaft, further compressing the resetting spring 36 until finally the hub can be forced back no farther, either because of the extreme tension of the spring 36, or because its coils have been forced together and form an unyielding stop between the abutment 37 and the hub 35.

A combined guide and drive lug 46 (Figs. 5 and 6) projects from the outer edge of the collar 31, into a notch 47 formed in the adjacent edge of the loose hub 35, the notch being of greater length than the width of the lug 46.

The lug 46 normally lies against one wall of the notch (Fig. 6), but as the tooth 33 rides part way up the inclined recess 34, during the rotation of the collar relatively to the hub, the lug traverses its notch until it strikes the opposite wall thereof and thus directly applies the force of the clutch 28 to the arm 39.

As this point is reached, the progressive clutch 28 has developed sufficient power to overcome the spring 8 and the friction of the parts, whereupon, the lug 46 slowly turns the hub 35 and the controller-actuating arm 39, causing the latter to wipe past the cam 41 of the lever 42, to swing the lever and shift the rocker 3, thereby throwing the switch and opening the motor circuit.

The resistance of the cam lever to the actuating arm causes the effective operation of the motor cut-out clutch mechanism.

It is evident that the operation of constricting the coils of the progressively-acting clutch spring 28, about the shaft 13, will store considerable power in the spring, the tendency of which is to turn the driven member 22 of the positive clutch in the opposite direction to that in which it is turned by the worm gear 12. Since the driven member 22 is held against reverse rotation by the pawls 21, the worm gear 12 and connected parts, the spring tension is exerted upon the shaft 13 at point 30 to turn the latter in the same direction that it turns when driving the controller-actuating arm 39.

Consequently, the actuating arm 39, after crowding past the apex of the cam 41 on the lever 42, frees the shaft 13 to the action of the flexible clutch spring 28, which thereupon rotates the shaft 13 and arm at a very rapid rate until the stored power is exhausted, and the coils have expanded to normal position.

As the arm 39 has only brushed past the apex of the cam 41, which remains in the position where it was left, by the arm, the latter upon its subsequent rapid rotations, would lightly strike the cam each time it passed, and cause a clicking or chattering noise.

This objectionable noise is obviated in the present arrangement by the tensioned resetting spring 36, the pressure of which against the hub 35, after the latter and its arm 39 escape from the lever 42, reversely turns the hub and the arm relatively to the fixed collar 31, owing to the contacting inclined surfaces of the recess 34 and tooth 33, to fit the recess over the tooth and thereby shift the arm axially of the shaft 13 to restore it to its original orbit or plane of movement in which it passes the cam 41 without contact. The lug 46 guides the hub 35 and arm 39 during their axial travel, the lug 46 being longer than the tooth 33, and the notch 47 in the hub being deeper than the recess 34. The length of the notch in excess of the width of the lug permits a limited relative rotation between the hub and collar without permitting the tooth to escape from the recess.

The shaft 13, during its rapid rotation, under the influence of the spring 28, just after the switch is tripped or actuated, would acquire considerable momentum and the expenditure of power, if uncontrolled, might injure the spring clutch, or tear it away from its fastenings, to prevent which, I provide the shaft 13 with a head 48 (Figs. 2 and 8) secured thereto at 49, centrally of a circular chamber 50 formed in one face of the stationary supporting flange 18. Governor sectors or weights 51 slide loosely on spokes 52 projecting radially from the head, and are preferably equipped on their arcuate outer edges with leather or other noiseless wear cushions 53 adapted to rub along the circular wall of the chamber 50, when the sectors have slid outwardly due to centrifugal force, to govern the speed of rotation of the shaft.

Upon the expenditure of the power stored in spring 28, the shaft 13 might come to rest at any point in its rotation. Should the free end of arm 39 stop in the path of the apex of the cam 41 on lever 42, it would arrest the lever as it is shifted by the operator, upon depression of the "on" button 1, before the blade 5 engages contacts 6 and 7, and would thus prevent the completion of the motor circuit and lock the machine against operation.

To prevent such a possibility, I provide an arresting means for the shaft and actuating arm, comprising a resilient spider or plate 54 (Figs. 2 and 8), preferably triangular in shape, and fixed to the inner face of the head 48, as at 55 (Fig. 2), so that its arms press against the face of the chamber 50. Pips or bosses 56 on the arms engage indentations 57 in the face of the chamber 50, which indentations are arranged out of line with the apex of the cam 41. As the shaft turns, the pips or bosses wipe over the face of the chamber and into and out of the indentations therein until the power previously stored in the spring 28 is practically exhausted, whereupon the pips will seat in the indentations and arrest the shaft 13 to hold the actuating arm 39 out of line with the apex of the cam 41.

This arrangement has proven very satisfactory in operation, but if the actuating arm 39 should be intentionally or possibly accidentally, arrested in the path of the high point of the cam, it may readily be displaced by turning the shaft 13 slightly in either direction, the abutment 37 being provided with a knurled head for this purpose.

The contraction and expansion of the coils of the flexible clutch spring 28 may be attended by some noise, particularly when the spring is unwinding, to deaden which I inclose the spring in a sheath, including a tubular lining 58 (Fig. 2), preferably of wood or fiber, which, if scored by the coils, will not cause them to bind, the scorings being erased, or running into each other as the device is used. Such tubular lining fits within a metal cylinder 59, which supports the lining, and is mounted at its opposite ends on the flange 24 of the sleeve member 23, and the periphery of the bearing gland 15, respectively. The flange 24 may turn relatively to the cylinder 59. Graphite is preferably introduced into the space inclosed by the lining to afford a supply of lubricant. This lining 58 also prevents undue relaxation of the spring 28, and reduces the possibility of breakage of the spring, to a minimum.

If there were no means for disabling or resetting the foregoing automatic motor cutout, it would be necessary for the operator to continually operate the circuit-closing button 1 of the switch 997, in order to continue the machine in operation, to avoid which disadvantage, I provide means actuated by the depression of the starting key 915 1/2 (Fig. 1), which in effect, renders the automatic cut-out inoperative so long as the machine is operated at reasonable intervals, as when the machine is in active use.

Depressing the starting key 915 1/2 rocks the motor drive clutch-releasing finger 1665 1/4 fast on the shaft 1602, as heretofore explained, to enable the motor to drive the machine. Such rocking of the releasing finger thus turns the shaft 1602, one end of which projects outside the hanger 1665 in which it has its bearings. Arms 60 (Figs. 1 and 6) on the projecting end of the shaft 1602 embrace the casing 59, and links 61 connect the arms with the annular bearing 62 of a clutch-releasing device slidably mounted on the casing 59. An internally grooved flange 63 (Fig. 2), carried by the bearing, incloses the pawls or dogs 21 to protect and guard the latter, the outer circular lip 64 of such flange lying adjacent lugs 65 projecting outwardly from the dogs.

As the shaft 1602 turns, it rocks the arms 60 thereon to draw the clutch-release member forwardly on the supporting casing 59 and cause the lip 64 to engage the lugs 65 to rock the pawls 21 out of engagement with the ratchet or driven member 22 of the positive clutch. The ratchet 22 thus freed to the action of the partially wound clutch spring 28, is reversely rotated thereby, until the stored power is expended, or until, upon the release of the starting key, the restoring spring 1684 (Fig. 3) returns the parts to their normal positions, thereby permitting pawl springs 25 to reëngage the pawls 21 with the ratchet 22.

In this manner, the automatic clutch mechanism is reset whenever the starting key is depressed, to extend the time during which the machine is operable.

An arm 1655$^a$ (Fig. 1) on the shaft 1602, has a stud 1655 playing in a slot 1665$^a$ in the hanger 1665 to limit the rotation of the shaft 1602, and hence the travel of the clutch-releasing device, in either direction.

The positive, flexible and delayed clutch mechanisms are arranged in train, and are successively operated.

Changes may be made in the form and arrangement of the several parts set forth, and parts omitted, without departing from the spirit and scope of this invention. For example, the delayed clutch mechanism comprising, in the present embodiment, the collar 31 and hub 35 might be excluded, or the principle of the delayed clutch might be retained and extended without using the flexible clutch spring 28.

The length of time elapsing between the moment at which the motor circuit is completed, and the moment when the circuit is automatically broken, may be diminished or extended by shortening or lengthening the spring 28, enlarging or decreasing the diameter of its coils, or lengthening or shortening the resetting spring 36, and correspondingly varying the height of the tooth 33 and the depth of the inclined recess 34. Or such interval may be changed by altering the shape or height of the cam 41 on lever 42.

I have not applied the term "time-controlled" to the foregoing invention, because it is not strictly speaking a time-controlled mechanism, there being no horologic device in control thereof.

What I claim as new, is:—

1. The combination with a motor; and a power controller to switch the power on and off relatively to the motor; of a motor-driven progressively-acting clutch mechanism to actuate the controller, the operation of said clutch mechanism being effected by the resistance offered by the controller; and means to disconnect the clutch mechanism from the motor at will, to enable the clutch mechanism to restore to its initial condition.

2. The combination with a motor; and a power controller to switch the power on and off relatively to the motor; of a controller-actuator; and a progressively-acting, motor-driven, power-accumulating clutch to drive the actuator, and operate the controller, the operation of said clutch being controlled by the resistance which it encounters; and means to disconnect the clutch from the motor at will, to enable the idle expenditure of the accumulated power.

3. The combination with a motor; and a power controller to switch the power on and off relatively to the motor; of a motor-driven clutch mechanism; a constricting clutch mechanism driven thereby; controller-actuating means operated by the constricting clutch mechanism; and means to disable the motor-driven clutch mechanism at will, to disconnect the constricting clutch mechanism and motor, and permit the constricting clutch mechanism to resume its normal relaxed condition.

4. The combination with a motor; and a power controller to switch the power on and off relatively to the motor; of an automatic motor cut-off, including a shaft, a motor-driven releasable clutch; a flexible, power-accumulating means operated by the motor-driven clutch to turn the shaft; a controller-actuator driven by the shaft; and means to operate the clutch at will to disconnect the power-accumulating means and the motor, to permit the power-accumulating means to idly discharge its stored power.

5. The combination with a motor; and a power controller to switch the power on and off relatively to the motor; of an automatic motor cut-off, including a shaft; a motor-driven clutch; a flexible, power-accumulating means operated by the motor-driven clutch to turn the shaft, the operation of said means being effected by the resistance to its movement offered by the power controller; a controller-actuator driven by the shaft; and means to operate the clutch at will to disconnect the power-accumulating means and the motor, to permit the power-accumulating means to idly discharge its stored power.

6. The combination with a motor; and a power controller to switch the power on and off relatively to the motor; of an automatic motor cut-out, including a spring; a releasable connection between the tensioning means and the motor to tension the spring; a rotatable shaft to which the spring is connected, the shaft being driven by the spring; a controller-actuating device mounted on the shaft, and having a substantially temporary contact with the controller; and means to operate the releasable connection at will to disconnect the motor and the spring, to permit the latter to idly expend the tension previously accumulated.

7. The combination with a motor; and a power controller to switch the power on and off relatively to the motor; of an automatic motor cut-off, including a rotatable member;

a releasable driving connection between the rotatable member and the motor; a shaft; a controller-actuating device mounted thereon; a spring coiled about the shaft, one end of the spring being driven by the rotatable member and the other end being connected to the shaft; and means operable at will to disable the driving connection, to enable the spring to resume its normal relaxed condition.

8. The combination with a motor; and a power controller to switch the power on or off relatively to the motor; of a motor-driven member having a pawl; a toothed wheel normally engaged by the pawl; a shaft on which the motor-driven member and wheel are loosely mounted; a constricting clutch mechanism surrounding the shaft and driven by the wheel; and a controller-actuating means associated with the shaft to be operated by the constricting clutch mechanism.

9. The combination with a motor; and a power controller to switch the power on or off relatively to the motor; of an actuating means for the controller; and a motor-driven, progressively-acting clutch mechanism to operate the controller, the operation of said clutch mechanism being controlled by the resistance offered by the controller; an arresting device for the actuating means, effective subsequently to the operation of the controller, to check the actuating means at a predetermined point in its travel.

10. The combination with a motor; and a power controller to switch the power on or off relatively to the motor; of an automatic motor cut-out, including a spring; means to tension the spring; a connection between the tensioning means and the motor; a shaft to which the spring is connected; a controller-actuating device mounted on the shaft; and means to arrest the shaft and controller-actuating device in non-interfering position relatively to the controller.

11. The combination with a motor; and a power controller to switch the power on and off relatively to the motor; of a controller-actuating device; a progressively-acting power-accumulating means to drive the actuating device which is adapted to continue its travel subsequently to the actuation of the controller until the power accumulated in the progressively-acting means is substantially exhausted; and means to arrest the actuating device in non-interfering position relatively to the controller.

12. The combination with a motor; and a power controller to switch the power on or off relatively to the motor; of a shaft; a progressively-acting, constricting, power-accumulating means to turn the shaft; a motor-driven connection with the power-accumulating means; a controller-actuating device on the shaft; and means to arrest the actuating device in non-interfering position relatively to the controller subsequently to the automatic actuation of the controller.

13. The combination with a motor; and a power controller to switch the power on or off relatively to the motor; of a shaft; a progressively-acting, constricting, power-accumulating means to turn the shaft; a motor-driven connection with the power-accumulating means; a controller-actuating device on the shaft; the power-accumulating means adapted to continue to turn the shaft and actuating device after the actuation of the controller, until its power is substantially exhausted; and means to arrest the actuating device in non-interfering position relatively to the controller, comprising a resilient plate fixed to the shaft and having a plurality of arms; bosses on the arms, and a stationary surface against which the plate turns, and having indentations in the paths of the bosses to arrest the plate and shaft when the power in the accumulating means is practically expended.

14. The combination with a motor; and a power controller to switch the power on or off relatively to the motor; of a motor-driven member; a controller-actuating means; a progressively-acting clutch mechanism operated by the motor-driven member to drive the actuating means, the operation of said clutch mechanism being controlled by the resistance offered by the controller; and key-operated means to disable the connection between the motor-driven member and the progressive clutch mechanism, to enable the latter to return to its initial condition, prior to the automatic operation of the controller.

15. The combination with a motor; and a power controller to switch the power on or off relatively to the motor; of a motor-driven member; a controller-actuator; a flexible, power-accumulating means connected with the motor-driven member to drive the controller-actuator, the operation of said means being controlled by the resistance offered by the controller; and manually-operable means to interrupt the connection between the motor-driven member and the power-accumulating means, to enable the latter to return to initial condition prior to the automatic operation of the controller.

16. The combination with a motor; and a power controller operable at will to alternately switch the power on and off relatively to the motor; of progressively-acting, motor-driven means to automatically actuate the controller, including several clutch mechanisms arranged in train whereby one clutch mechanism is driven by the preceding mechanism and manually-operable means to interrupt the connection between the motor and the clutch mechanisms to enable the automatic return of such mechanisms to normal.

17. The combination with a motor; and a power controller to switch the power on or off relatively to the motor; of means to automatically operate the power controller to switch the power off, including a train of clutch mechanisms, driven from the motor, one of which clutch mechanisms is adapted to act progressively to accumulate sufficient power to become effective; controller-actuating means operated by the progressive clutch mechanism to switch the power off; and means to release another of the clutch mechanisms in said train to enable the automatic restoration of the progressive clutch mechanism to its initial condition after it has commenced to accumulate power.

18. The combination with a motor; and a power controller to switch the power on or off relatively to the motor; of a motor-driven clutch; a constricting device connected to, and gradually rendered effective by the driven member of the clutch; a shaft operable by the constricting member after it has become effective; a controller-actuating device operated by the shaft to trip the controller; and manually-operable means to release the clutch and permit the constricting member to automatically restore to ineffective condition.

19. The combination with a motor; and an unobstructed power controller to switch the power on and off relatively to the motor; of an automatic motor cut-out, including a spring; a releasable connection between the spring and the motor whereby the motor tensions the spring; a rotatable shaft adapted to be driven by the spring; a controller-actuating device mounted on the shaft to coact with the power controller and switch the power off; and means to interrupt the connection between the motor and the spring, to enable the spring to idly return to normal condition.

20. The combination with a motor; and a power controller to switch the power on and off relatively to the motor; of a motor-driven progressively-acting clutch mechanism to actuate the controller, the controller including a member adjustable into and out of the path of the clutch mechanism, the operation of said clutch mechanism being effected by the resistance offered by the controller through the adjustable member; and governing means to prevent injury to the progressively-acting clutch subsequently to its escape from the controller after overcoming the resistance thereof.

21. The combination with a motor; and a power controller to switch the power on and off relatively to the motor; of a plurality of successively operable clutch mechanisms driven from the motor; controller-actuating means operated through said clutch mechanisms, and temporarily restrained by the power controller; and a governor to regulate the speed of rotation of the clutch mechanisms to prevent injury thereto subsequently to the disengagement of the controller-actuating means and the power controller.

22. The combination with a motor; and a power controller to switch the power on or off relatively to the motor; of a shaft; a motor-driven, progressive, constricting clutch mechanism to operate the shaft; a controller-actuating member driven from the shaft; and a governor to regulate the speed of rotation of the shaft subsequently to the operation of the controller by its actuating member.

23. The combination with a motor; and a power controller to switch the power on or off relatively to the motor; of a shaft; a motor-driven, progressive, constricting clutch mechanism to operate the shaft; a controller-actuating member driven from the shaft; a governor to regulate the speed of rotation of the shaft subsequently to the operation of the controller by its actuating member; and means to displace the controller-actuating member relatively to the controller subsequently to the operation of the latter.

24. The combination with a motor; and a power controller to switch the power on or off relatively to the motor; of a shaft; a motor-driven, progressive, constricting clutch mechanism to operate the shaft; a controller-actuating member driven from the shaft; a governor to regulate the speed of rotation of the shaft subsequently to the operation of the controller by its actuating member; and means to arrest the controller-actuating member in non-interfering position relatively to the controller, subsequently to the operation thereof.

25. The combination with a motor; and a power controller to switch the power on or off relatively to the motor; of a shaft; a motor-driven, progressive, constricting clutch mechanism to operate the shaft; a controller-actuating member driven from the shaft; a governor to regulate the speed of rotation of the shaft subsequently to the operation of the controller by its actuating member; the governor including a stationary member having indentations therein; a friction device turning with the shaft and having pips to enter the indentations in the governor member to arrest the controller-actuating member in non-interfering position relatively to the controller subsequently to the operation of the latter.

26. The combination with a motor; and a power controller to switch the power on or off relatively to the motor; of an automatic motor cut-out, including a power-accumulating member; a drive connection between the power-accumulating member and the motor; a shaft driven by the member; a controller-actuating device on the shaft;

means shiftable by the power controller, into the path of the actuating device to check the rotation of the shaft; means operable at will to interrupt the drive connection to permit the power stored in the accumulating member to expend prior to the actuation of the power controller; and a governor on the shaft to control the rotation thereof under the influence of the power accumulating member immediately subsequent to the actuation of the power controller.

27. The combination with a motor; and a power controller to switch the power on and off relatively to the motor; of an automatic motor cut-out, including a power-accumulating spring; means to store power in the spring; a releasable connection between the tensioning means and the motor; means operable at will to release such connection; a shaft to which the spring is connected; a controller-actuating device mounted on the shaft and driven thereby; the controller-actuating device being releasably restrained by the power controller; and a governor on the shaft to regulate the speed of rotation thereof, under the power stored in the spring, immediately subsequent to the escape of the controller-actuating device from the power controller.

28. The combination with a motor; and a power-controller to switch the power on or off relatively to the motor; of a controller-actuating device; a progressively-acting power-accumulating means to drive the actuating device which is adapted to continue its travel subsequently to the actuation of the controller until the power accumulated in the progressively-acting means is substantially expended; and means to govern this expenditure of power.

29. The combination with a motor; and a power controller to switch the power on or off relatively to the motor; of a motor-driven clutch mechanism; a constricting clutch mechanism driven thereby; a sheath for the constricting clutch; an annular key-operated release member for the motor-driven clutch, slidably mounted on the sheath; and controller-actuating means operated by the constricting clutch mechanism.

30. The combination with a motor; and a power controller to switch the power on or off relatively to the motor; of a rotatable motor-driven member; spring-pressed pawls pivotally mounted thereon; a circumferentially-toothed wheel normally engaged by the pawls; a constricting clutch mechanism driven therefrom; a sheath inclosing the clutch mechanism; an annular key-operated release member slidable on the sheath, and having an annular flange to disengage the pawls; and controller-actuating means operated by the constricting clutch mechanism.

31. The combination with a motor; and a power controller to switch the power on or off relatively to the motor; of a motor-driven member; a controller-actuator; a flexible, power-accumulating means connected with the motor-driven member to drive the controller-actuator, the operation of said means being controlled by the resistance offered by the controller; manually-operable means to interrupt the connection between the motor-driven member and the power accumulating means, to enable the latter to return to initial condition prior to the automatic operation of the controller; and means to automatically displace the controller-actuator relatively to the controller.

32. The combination with a motor; and a power controller to switch the power on and off relatively to the motor; of a controller-actuator; a progressively-acting, motor-driven, power-accumulating clutch to drive the actuator, and operate the controller, the operation of said clutch being effected by the resistance which it encounters from the controller; and means to displace the actuator relatively to the controller subsequently to the automatic operation of the latter to prevent further engagement of the controller-actuator with the power controller until the latter is reset.

33. The combination with a motor; and a power controller to switch the power on or off relatively to the motor; of a plurality of successively operable clutch mechanisms driven from the motor; controller-actuating means operated by one of the clutch mechanisms; and means to displace the controller-actuating means to non-interfering position relatively to the controller.

34. The combination with a motor; and a power controller to switch the power on and off relatively to the motor; of a releasable motor-driven clutch mechanism; a shaft; a progressively-acting clutch mechanism operated by the motor-driven clutch and adapted to gradually constrict about the shaft; means to release the motor-driven clutch at will to enable the progressively-acting clutch to return to normal relaxed condition; a controller-actuating arm loose on the shaft; and a clutch rotatably driven by the progressively-acting mechanism to operate the arm.

35. The combination with a motor; and a power controller to switch the power on and off relatively to the motor; of a releasable motor-driven clutch mechanism; a progressively-acting clutch mechanism operated thereby; means to release the motor-driven clutch at will to enable the progressively-acting clutch to return to normal relaxed condition; an actuating arm; and another clutch mechanism controlled by the progressively-acting clutch mechanism to operate the arm.

36. The combination with a motor; and a power controller having manual means to switch the power on and off relatively to the motor; of an automatic motor cut-out, including a controller-actuating device, and a progressive constricting clutch driven from the motor, to operate the actuating device; means to disconnect the motor and the constricting clutch at will, to enable the latter to return to normal relaxed condition; the power controller including a lever shiftable by the manual means into or out of the path of the actuating device and adapted to be driven by said actuating device to operate the controller.

37. The combination with a motor; and a power controller having means to switch the power on and off relatively to the motor; of an automatic motor cut-out, operable independently of said switching means, and including a spring; a releasable drive connection between the spring and the motor to tension the spring; a shaft to which the spring is fastened; a controller-actuating device on the shaft; and means operable at will to interrupt the drive connection to enable the spring to resume its normal relaxed condition; the power controller having a member shiftable by the switching means into the path of the actuating device, to enable the latter to operate the controller when the switching means is in one of its adjusted positions.

38. The combination with a motor; and a power controller having means to switch the power on and off relatively to the motor; of an automatic motor cut-out, operable independently of the switching means, and including a spring; a releasable drive connection between one end of the spring and the motor to tension the spring; a shaft to which the other end of the spring is fastened; a controller-actuating device axially shiftable on and rotatable with the shaft; and means operable at will to interrupt the drive connection to enable the spring to resume its normal relaxed condition; the power controller also including means shiftable by the switching means into the path of the actuating device, to temporarily arrest the latter to effect the axial travel of the actuating device along the shaft; and means to restore the actuating device to normal position upon its escape from the shiftable means.

39. The combination with a motor; and a power controller to switch the power on or off relatively to the motor; of a motor-operated clutch; a shaft; a constricting device connected to the driven member of the clutch, and to the shaft, respectively; a controller-actuating arm loose on the shaft; a dilatory clutch mechanism to cause the arm to turn with the shaft; and manually-operable means to release the motor-driven clutch and enable the constricting device to return to normal.

40. The combination with a motor; and a power controller to switch the power on or off relatively to the motor; of a motor-driven clutch mechanism; a shaft; a progressively-acting clutch mechanism operated by the motor-driven clutch and adapted to gradually constrict about the shaft; a controller-actuating arm loose on the shaft; a clutch driven by the progressively-acting mechanism to operate the arm; and means to restore the arm to normal position, to normally prevent interference with the controller.

41. The combination with a motor; and a power controller to switch the power on or off relatively to the motor; of a motor-driven clutch mechanism; a shaft; a progressively-acting clutch mechanism operated by the motor-driven clutch and adapted to gradually constrict about the shaft; a controller-actuating arm loose on the shaft; a clutch driven by the progressively-acting mechanism to operate the arm; and means to arrest the arm in non-interfering position relatively to the controller.

42. The combination with a motor; and a power controller to switch the power on or off relatively to the motor; of a motor-driven clutch mechanism; a progressively-acting clutch mechanism operated thereby; an actuating arm; another clutch mechanism controlled by the progressively-acting clutch mechanism to operate the arm; and means to arrest the arm in non-interfering position relatively to the controller, after the automatic operation of the latter.

43. The combination with a motor; and a power controller to switch the power on and off relatively to the motor; of a motor-driven clutch member; an abutment spaced apart therefrom; a loosely-supported controller-actuating arm having a coacting clutch member and shiftable along its support between the driving clutch member and the abutment, the driving clutch member rotatable independently of the arm and adapted to crowd the arm toward the abutment until the two clutch members coact to turn the arm; and a cam lever connected to the controller to be shifted into and out of the path of the arm and actuated by the arm, when the lever is in one of its adjusted positions.

44. The combination with a motor; and a power controller to switch the power on or off relatively to the motor; of a loosely-supported controller-actuating means; an abutment on one side of the controller-actuating means; a motor-driven dilatory clutch member on the opposite side thereof to first shift the controller-actuating means toward the abutment and subsequently to turn the controller-actuating means to actuate the controller; and a lever connected with the controller and shiftable into and out of the path of the controller-actuating means, and adapted to be rocked by the actuating means when the controller is in one of its positions.

45. The combination with a motor; and a power controller to switch the power on or off relatively to the motor; of a loosely-supported controller-actuating means; an abutment on one side of the controller-actuating means; a motor-driven dilatory clutch member on the opposite side thereof to shift the controller-actuating means toward the abutment until it turns with the clutch member to actuate the controller; manually-operable means to interrupt the operation of the dilatory clutch member prior to the automatic actuation of the controller; and means operable to return the actuating device to normal position.

46. The combination with a motor; and a power controller to switch the power on or off relatively to the motor; of a shaft; a controller-actuating device having a hub loose on the shaft, the hub having an inclined recess, and a guide recess; a motor-driven clutch member fast on the shaft on one side of the hub, and having an inclined tooth normally entered in the recess; an abutment fast on the shaft on the opposite side of the hub; a guide on the clutch member seated in the guide recess to limit the relative rotation of the member and hub, and means to return the actuating device to normal position.

47. The combination with a motor; and a power controller to shift the power on or off relatively to the motor; of an automatic motor cut-out, including a controller-actuating device; means adapted to gradually accumulate sufficient power to operate the controller-actuating device; a drive connection between the motor and said means to enable the motor to store power therein; and means operable at will to interrupt the drive connection and enable the power accumulating means to idly expend the stored power therein and return to normal impotent condition.

48. The combination with a motor; and a power controller to switch the power on and off relatively to the motor; of a shaft; a motor-driven member rotatable on the shaft; a connection releasable at will between the motor and the rotatable member; a constricting coupling surrounding the shaft and connecting the shaft and rotatable member; and a controller-actuating means associated with the shaft, and driven thereby.

49. The combination with a motor; and a power controller having means to switch the power on and off relatively to the motor, including a yielding member to normally retain the mechanism of the power controller where adjusted; of a progressively-acting clutch mechanism driven by the motor to actuate the power controller against the resistance offered by the yielding member; and means to disconnect the clutch mechanism and the motor at will.

50. The combination with a motor; and a power controller having manually controlled means to switch the power on and off relatively to the motor, including a yielding member to normally retain the manually controlled means where adjusted; of a progressively-acting clutch mechanism driven by the motor to actuate the power controller against the resistance offered by the retaining member, the clutch mechanism and power controller being disconnected when the motor is idle; and means to disconnect the clutch mechanism and the motor at will.

51. The combination with a motor; and a power controller to switch the power on and off relatively to the motor; of an automatic motor cut-out, including a spring, motor-driven means to which one end of the spring is releasably connected to store power in the spring; a shaft driven by the spring; a controller-actuator having a non-continuous engagement with the controller; and means operable at will to release the connection between the spring and motor-driven means, whereby the power accumulated in the spring may be discharged from either end thereof, depending upon the release of the motor-driven means or the escape of the controller-actuator from the power controller.

52. The combination with a motor; and a power controller to switch the power on and off relatively to the motor; of a progressively acting clutch; releasable means to connect the clutch and motor; a controller-actuator driven by the clutch; the power controller including a member adjustable into and out of the path of the clutch mechanism to oppose a resistance to the free travel of the controller-actuator and thus effect the energization of the clutch; and means to disable the means connecting the clutch and motor.

53. The combination with a calculating machine, having a continuously running motor; a power controller to switch the power on or off relatively to the motor; a counter shaft; a clutch mechanism interposed between the counter shaft and the motor; and a manually-operable starting key to control the clutch mechanism; of means to automatically operate the power controller to switch the power off, including a pair of clutch mechanisms arranged in train and driven from the motor, one of which clutch mechanisms is adapted to act progressively to accumulate sufficient power to become effective; controller-actuating means operable by the progressive clutch mechanism, to switch the power off; and means controlled by the starting key to release the other of said clutches, to enable the automatic restoration of the progressive clutch mechanism to its initial condition, at any time during its progressive action and prior to its operation of the power controller.

54. The combination with a calculating machine, having a continuously running motor; a power controller to switch the power on or off relatively to the motor; a counter shaft; a clutch mechanism interposed between the counter shaft and the motor; and a manually-operable starting key to control the clutch mechanism; of means to automatically operate the power controller, including a controller-actuating device; a progressive clutch mechanism connected therewith; means, including a separable clutch, to transmit power from the motor to the progressive clutch, whereby the latter gradually stores sufficient power to operate the controller-actuating device to trip the controller; and starting key-controlled means to release the separable clutch, and enable the progressive clutch to automatically return to its initial impotent condition.

ARTHUR PENTECOST.